(12) United States Patent  
Kyeong et al.

(10) Patent No.: US 8,675,715 B2  
(45) Date of Patent: Mar. 18, 2014

(54) APPARATUS OF 60 GHZ BAND MODEM

(75) Inventors: Mun Geon Kyeong, Daejeon (KR); Yun Ho Choi, Daejeon (KR); Woo Yong Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 288 days.

(21) Appl. No.: 12/977,261

(22) Filed: Dec. 23, 2010

(65) Prior Publication Data

US 2011/0150040 A1   Jun. 23, 2011

(30) Foreign Application Priority Data

Dec. 23, 2009   (KR) .................. 10-2009-0129587  
Oct. 8, 2010   (KR) .................. 10-2010-0098232

(51) Int. Cl.  
*H04B 1/38*   (2006.01)

(52) U.S. Cl.  
USPC ........... 375/219; 375/260; 375/267; 375/340; 375/346; 343/869; 343/880; 343/881; 343/882; 343/883; 343/900; 343/901; 343/915

(58) Field of Classification Search  
USPC .......... 375/219, 260, 267, 340, 346; 343/869, 343/880–883, 889, 915, 900, 901  
See application file for complete search history.

(56) References Cited

U.S. PATENT DOCUMENTS

| | | | |
|---|---|---|---|
| 5,832,365 A * | 11/1998 | Chen et al. ..................... 455/15 |
| 6,188,914 B1 * | 2/2001 | Chheda ...................... 455/562.1 |
| 6,237,056 B1 * | 5/2001 | Lam et al. ..................... 710/305 |
| 7,079,869 B2 * | 7/2006 | Aytur et al. ................ 455/562.1 |
| 7,334,072 B1 | 2/2008 | Wright |
| 8,138,978 B1 * | 3/2012 | Vier et al. .................... 343/702 |
| 8,170,166 B2 * | 5/2012 | Stebbings et al. ............ 375/354 |
| 2004/0090383 A1 * | 5/2004 | Wang et al. ................. 343/702 |
| 2004/0110469 A1 * | 6/2004 | Judd et al. ..................... 455/15 |
| 2004/0203347 A1 * | 10/2004 | Nguyen ..................... 455/13.3 |

(Continued)

FOREIGN PATENT DOCUMENTS

| KR | 10-0647906 | 11/2006 |
| WO | WO 2008/087595 | * 7/2008 |

OTHER PUBLICATIONS

Mehmet R. Yuce et al, "Design and performance of a wideband sub-sampling front-end for multi-standard radios", International Journal of Electronics and Communications, 2008, pp. 41-48.

(Continued)

*Primary Examiner* — Sophia Vlahos  
(74) *Attorney, Agent, or Firm* — Staas & Halsey LLP (57) ABSTRACT

A high-bandwidth communication modem such as an ultra wideband (UWB) communication modem or a high-giga wideband (HGWB) modem includes an interface configured to transceive data in connection with a host device, a baseband processor configured to process, in a parallel manner, a baseband signal being transceived between the interface and a parallel/serial converter, the parallel/serial converter configured to combine a parallel signal into a serial signal and output the serial signal, and separate a serial signal into a parallel signal and output the parallel signal, a radio frequency (RF) processor configured to reduce a frequency of a received UWB or HGWB signal and transmit the frequency-reduced signal to the parallel/serial converter, and increase a frequency of the serial signal received from the parallel/serial converter and transmit the frequency-increased signal to a directional antenna, and the directional antenna configured to transceive a wireless signal by forming a directional beam and control a direction of the directional beam.

10 Claims, 7 Drawing Sheets

(56) References Cited

U.S. PATENT DOCUMENTS

| | | | |
|---|---|---|---|
| 2004/0208255 A1* | 10/2004 | Yoshida et al. | 375/260 |
| 2005/0024276 A1* | 2/2005 | Izumi | 343/702 |
| 2007/0073935 A1* | 3/2007 | Kim et al. | 710/62 |
| 2007/0191068 A1* | 8/2007 | Ochi et al. | 455/562.1 |
| 2007/0217490 A1* | 9/2007 | Blake et al. | 375/222 |
| 2007/0268872 A1* | 11/2007 | Cromer et al. | 370/338 |
| 2008/0106476 A1* | 5/2008 | Tran et al. | 343/702 |
| 2008/0115230 A1* | 5/2008 | Kelley et al. | 726/32 |
| 2008/0136737 A1 | 6/2008 | Fratti et al. | |
| 2008/0170551 A1* | 7/2008 | Zaks | 370/338 |
| 2010/0035561 A1* | 2/2010 | Rettig et al. | 455/73 |
| 2010/0067585 A1* | 3/2010 | Cai et al. | 375/256 |

OTHER PUBLICATIONS

Yongsun Kim et al., Parallel Transmissions with Port Control in High Speed WPAN, pp. 102-103.

* cited by examiner

APPARATUS OF 60 GHZ BAND MODEM

CROSS-REFERENCE TO RELATED APPLICATIONS

This application claims the benefit of Korean Patent Application No. 10-2009-0129587 and of Korean Patent Application No. 10-2010-0098232, respectively filed on Dec. 23, 2009 and Oct. 8, 2010, in the Korean Intellectual Property Office, the disclosures of which are incorporated herein by reference.

BACKGROUND

1. Field of the Invention

The present invention relates to a high-bandwidth communication modem such as an ultra wideband (UWB) communication modem or a high-giga wideband (HGWB) modem and a structure thereof, capable of ultra high speed communication for UWB or HGWB high capacity data.

2. Description of the Related Art

At present, 60 GHz technology is most effective for ultra high speed transmission of ultra wideband (UWB) or high-giga wideband (HGWB) data. Since signals in the 60 GHz band have a high directivity, a beam generation technology is a significant matter. Various methods defined by standards organizations, such as IEEE 802.15.3c, Ecma-387, wireless high definition (WiHD), wireless home digital interface (WHDI) and the like, are used for generation of a beam in the 60 GHz band.

The beam generation methods in the 60 GHz band include a beam steering method that avoids an obstacle by generating beams using a plurality of sub-arrays, and another beam steering method that uses a codebook for the same purpose. The beam generation methods may also be divided into an analog method using phase control and a digital adaptive method.

However, although being efficient in avoiding an obstacle, the beam steering method is unsuitable for a portable device due to relatively high power consumption at transmitting and receiving ends.

Accordingly, a fixed-type directional beam generation method is suggested to control a direction of an antenna when and as desired.

SUMMARY

An aspect of the present invention provides a high-giga wideband (HGWB) communication modem.

Another aspect of the present invention provides a HGWB communication modem having a static directional antenna.

Still another aspect of the present invention provides a HGWB communication modem configured to be capable of controlling a direction of the directional antenna.

Yet another aspect of the present invention provides a HGWB universal serial bus (USB) communication modem configured to be capable of controlling a direction of the directional antenna.

A further aspect of the present invention provides a HGWB communication modem configured to be capable of controlling a direction of the directional antenna so that the directional antenna can be physically fixed as desired by a user.

According to an aspect of the present invention, there is provided a HGWB communication modem including an interface configured to transceive data in connection with a host device, a baseband processor configured to process, in a parallel manner, a baseband signal being transceived between the interface and a parallel/serial converter, the parallel/serial converter configured to combine an input parallel signal into an output serial signal upon receiving the input parallel signal and output the output serial signal, and to separate an input serial signal into an output parallel signal upon receiving the input serial signal and output the output parallel signal, a radio frequency (RF) processor configured to reduce a frequency of a received HGWB signal and transmit the frequency-reduced signal to the parallel/serial converter, and increase a frequency of the output serial signal received from the parallel/serial converter and transmit the frequency-increased signal to a directional antenna, and the directional antenna configured to transceive a wireless signal by forming a directional beam and control a direction of the directional beam.

According to another aspect of the present invention, there is provided a HGWB communication modem including an interface configured to transceive data in connection with a host device, a directional antenna configured to include a second communication system, transceive a wireless signal by generating a directional beam, and control a direction of the directional beam, and a main body configured to comprise a first communication system, and comprise the interface and the directional antenna mounted on the main body.

According to another aspect of the present invention, there is provided a HGWB communication modem including an interface configured to transceive data in connection with a host device, a main body configured to comprise a first communication system, and comprise the interface mounted on the main body, and an extended body connected with the main body through a lead wire and configured to include a second communication system and a directional beam generator, and configured to control a direction of the directional beam output from the directional beam generator.

EFFECT

Embodiments of the present invention introduce a HGWB communication modem including a directional antenna capable of transceiving wireless signals by generating a directional beam and controlling a direction of the directional beam. A configuration enabling controlling of the direction of the directional beam output from the directional antenna simplifies hardware structure, increases price competitiveness, and increases energy efficiency.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Embodiments of the present invention relate to high-bandwidth communication modem such as an ultra wideband (UWB) or a high-giga wideband (HGWB) modem communication modem having a structure capable of controlling a direction of a directional antenna.

Figure 1:
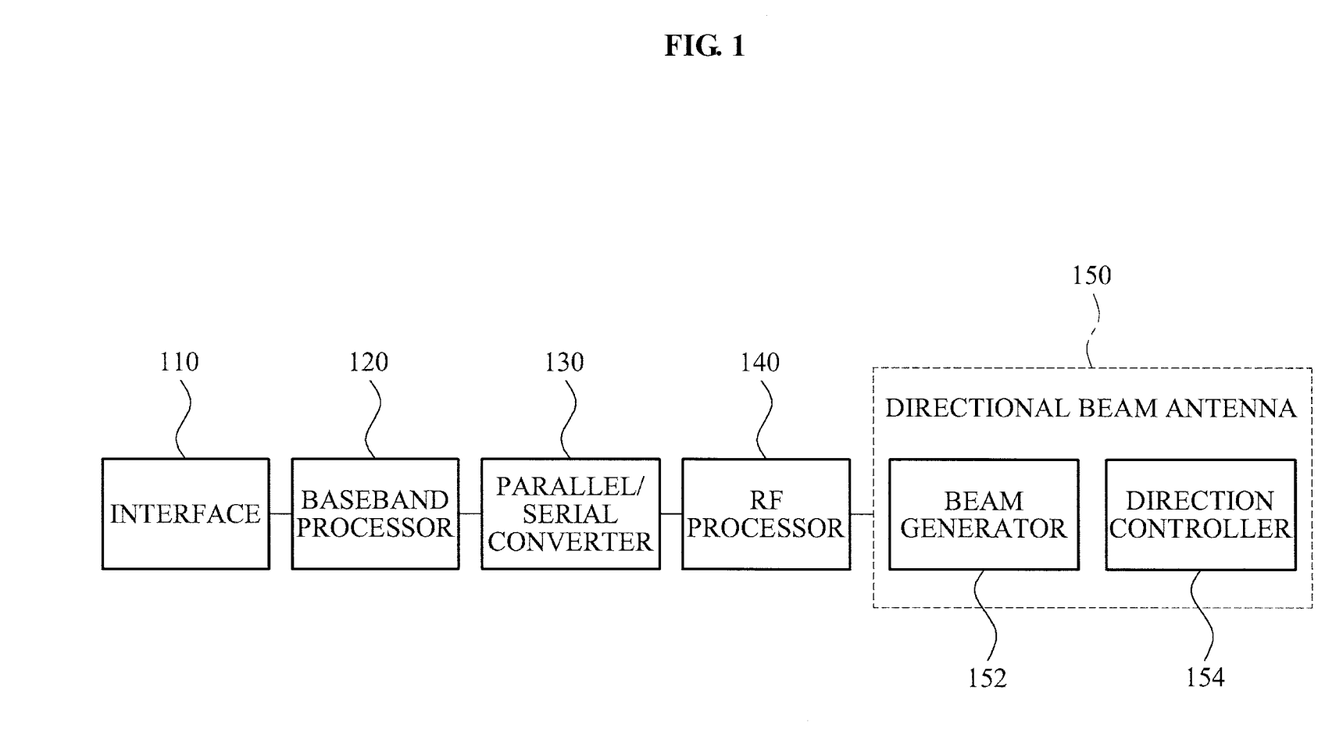
FIG. 1 is a diagram illustrating a configuration of high-giga wideband (HGWB) communication modem according to an embodiment of the present invention.

FIG. 1 illustrates a configuration of a HGWB communication modem according to an embodiment of the present invention. Referring to FIG. 1, the HGWB modem includes an interface 110, a baseband processor 120, a parallel/serial converter 130, a radio frequency processor 140, and a directional antenna 150.

The interface 110 is an input/output device connected to a host device. The interface 110 outputs data received from the baseband processor 120 to the host device, and transmits data input from the host device to the baseband processor 120.

An input/output interface such as a high-definition multimedia interface (HDMI) or a universal serial bus (USB) interface may be used as the interface 110.

The baseband processor 120 processes a baseband signal transceived between the interface 110 and the parallel/serial converter 130. For example, in the case of signal transmission, functions such as channel coding, spreading, and inverse fast Fourier transform (IFFT) are performed with respect to data to be transmitted, in a parallel manner. In the case of signal reception, functions such as FFT, despreading, and channel decoding are performed with respect to signals to be received, in a parallel manner.

The parallel/serial converter 130 combines a plurality of parallel signals received from the baseband processor 120 and transmits the combined serial data to the RF processor 140. In addition, the parallel/serial converter 130 converts a frequency-reduced serial data received from the RF processor 140 into a plurality of parallel signals, and transmits the converted plurality of parallel signals to the baseband processor 120.

The parallel/serial converter 130 combines an input parallel signal received from the baseband processor 120 into an output serial signal and transmits the output serial signal to the RF processor 140. In addition, the parallel/serial converter 130 converts a frequency-reduced serial signal received from the RF processor 140 into a output parallel signal, and transmits the output parallel signal to the baseband processor 120.

The RF processor 140 reduces a frequency of the HGWB signal received through the directional antenna and transmits the frequency-reduced HGWB signal to the parallel/serial converter 130. Also, the RF processor 140 increases a frequency of the combined serial data received from the parallel/serial converter 130 and transmits the frequency-increased serial data through the directional antenna.

The directional antenna 150 may include a directional beam generator 152 and a direction controller 154. The directional beam generator 152 may generate a directional beam to transmit the data frequency-increased by the RF processor 140 and transmit a wireless frequency signal received through the directional beam. The directional beam generator 152 sets a beam angle for the transmission to be smaller than a beam angle for the reception. For example, the directional beam generator 152 may generate the beam of about 60, 45, 30, and 15 degrees at the time of transmission while generating the beam of about 360, 180, 90, and 60 degrees at the time of reception.

Configuration of the direction controller 154 may be of various types as long as the direction controller 154 is capable of controlling a direction of the beam output from the directional beam generator 152. For example, the direction controller 154 may be configured to have at least one joint and rotation shaft or configured to have a ball shape.

Figure 2:
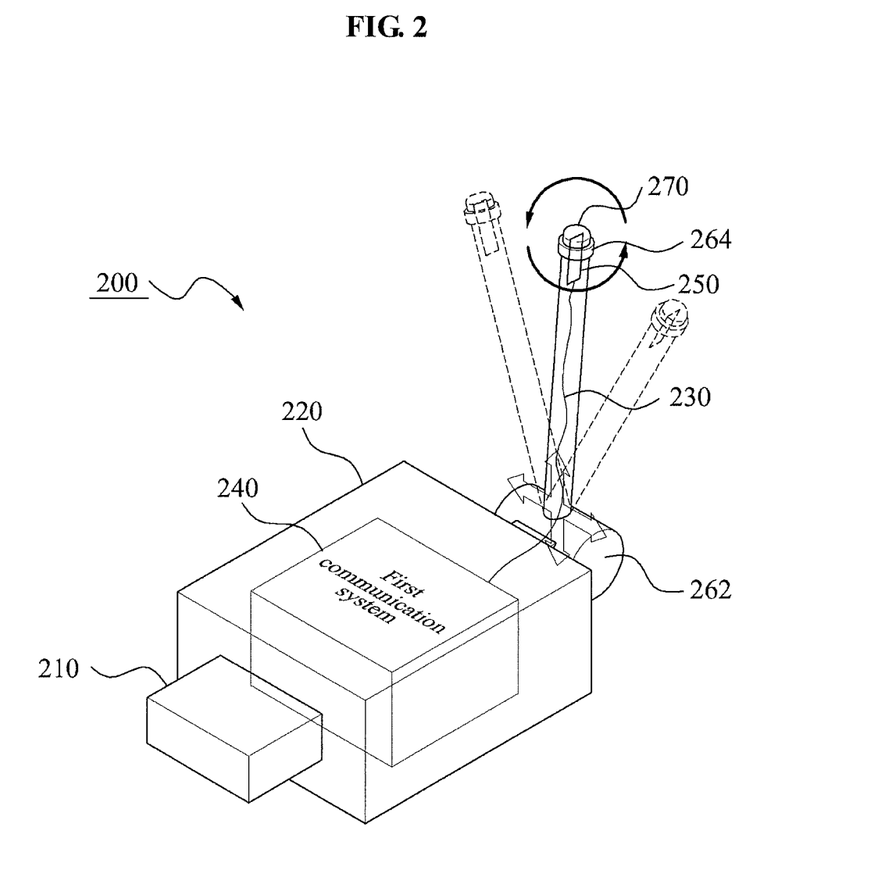
FIG. 2 is a diagram illustrating a configuration of a HGWB communication modem and a configuration enabling controlling of a direction of a beam, according to an embodiment of the present invention.

FIG. 2 is a diagram illustrating a configuration of a HGWB communication modem 200 and a configuration enabling controlling of the direction of the beam, according to an embodiment of the present invention.

Referring to FIG. 2, the HGWB communication modem 200 may externally include an interface 210, a main body 220, and an antenna 230.

The interface 210 is an input/output device in connection with a host device. A USB interface is used in the present embodiment.

The main body 220 may include a first communication system 240 which includes components used in data communication.

The antenna 230 may include a second communication system 250 which includes components used in data communication. The antenna 230 may also comprise a directional beam generator 270, and a joint part 262 and a rotation part 264 which are configured to control the direction of the beam generated by the directional beam generator 270.

The joint part 262 is configured to perform 2-axis rotation to control a direction of a pole of the antenna 230. The rotation part 264 is configured to rotate the directional beam generator 270 by about 360 degrees, thereby controlling the direction of the beam output from the directional beam generator 270.

The first communication system 240 may include at least one component among the baseband processor 120, the parallel/serial converter 130, and the RF processor 140. The second communication system 250 may include the remaining components that are absent from the first communication system 240.

An example where the HGWB communication modem 200 of FIG. 2 is applied will be described with reference to FIG. 5.

Figure 5:
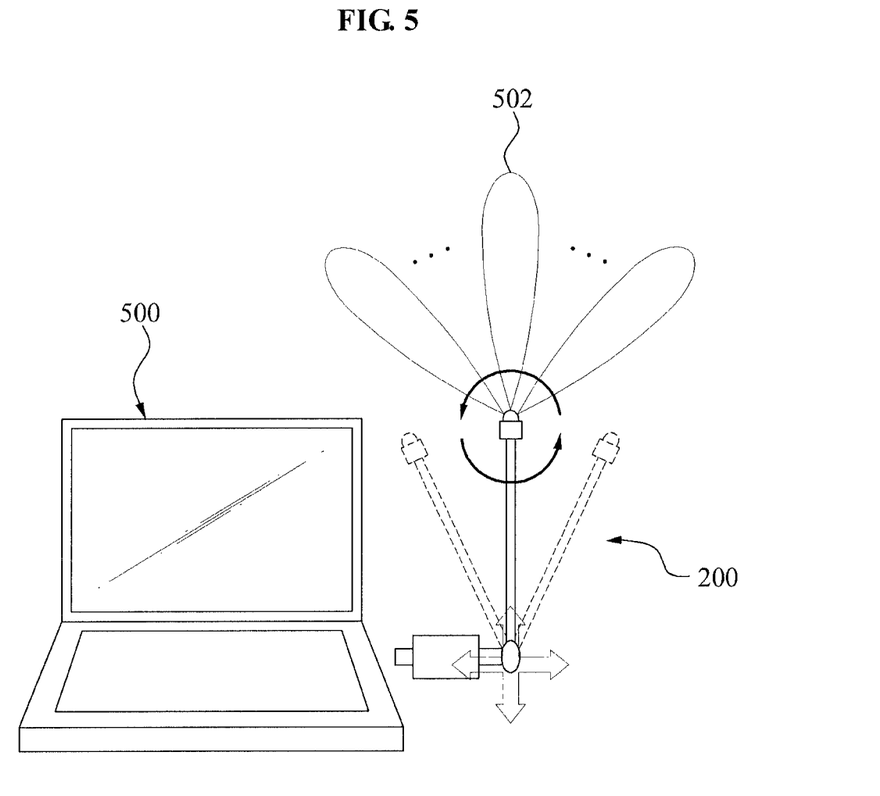
FIG. 5 is a diagram illustrating an example where a direction of a directional beam is varied in the HGWB communication modem of FIG. 2.

FIG. 5 is a diagram illustrating an example where a direction of a directional beam is varied in the HGWB communication modem 200 of FIG. 2.

Referring to FIG. 5, the HGWB communication modem 200 connected to a host device 500 generates a directional beam 502 for communication. The user may fix the directional beam 502 toward a target device to communicate with, by adjusting the joint part 262 and the rotation part 264 of the HGWB communication modem 200. Accordingly, communication with the target device may be achieved.

Figure 3:
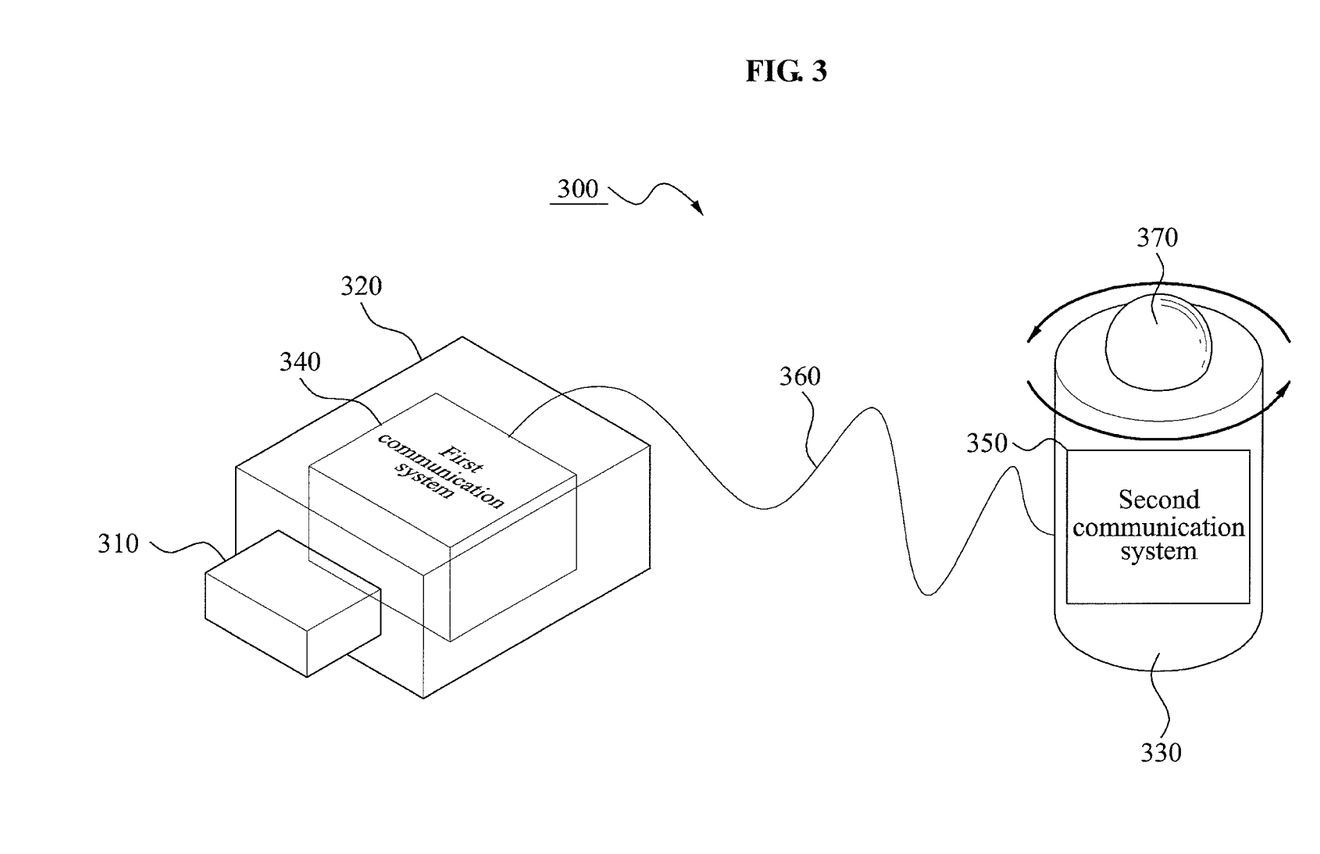
FIG. 3 is a diagram illustrating an organization of a HGWB communication modem and a configuration enabling controlling of a direction of a beam, according to another embodiment of the present invention.

FIG. 3 is a diagram illustrating an organization of a HGWB communication modem 300 and a configuration enabling controlling of a direction of a beam, according to another embodiment of the present invention.

Referring to FIG. 3, the HGWB communication modem 300 includes an interface 310, a main body 320, and an extended body 330.

The interface 310 is an input/output device in connection with a host device. According to the present embodiment, a USB interface is used as the interface 310.

The main body 320 may include a first communication system 340 that includes components used for data communication.

The extended body 330 may include a second communication system 350 that includes the components used for data communication, and a directional beam generator 370 that outputs a directional beam.

The directional beam generator 370 may have a ball shape coupled to the extended body 330 and configured to control the direction of the beam being output.

The first communication system 340 and the second communication system 350 are interconnected by a connection line 360 to enable communication with each other.

The first communication system 340 may include at least one component among the baseband processor 120, the parallel/serial converter 130, and the RF processor 140. Here, the second communication system 350 may include the remaining components that are absent from the first communication system 340.

An example where the HGWB communication modem 300 is applied will be described with reference to FIG. 6.

Figure 6:
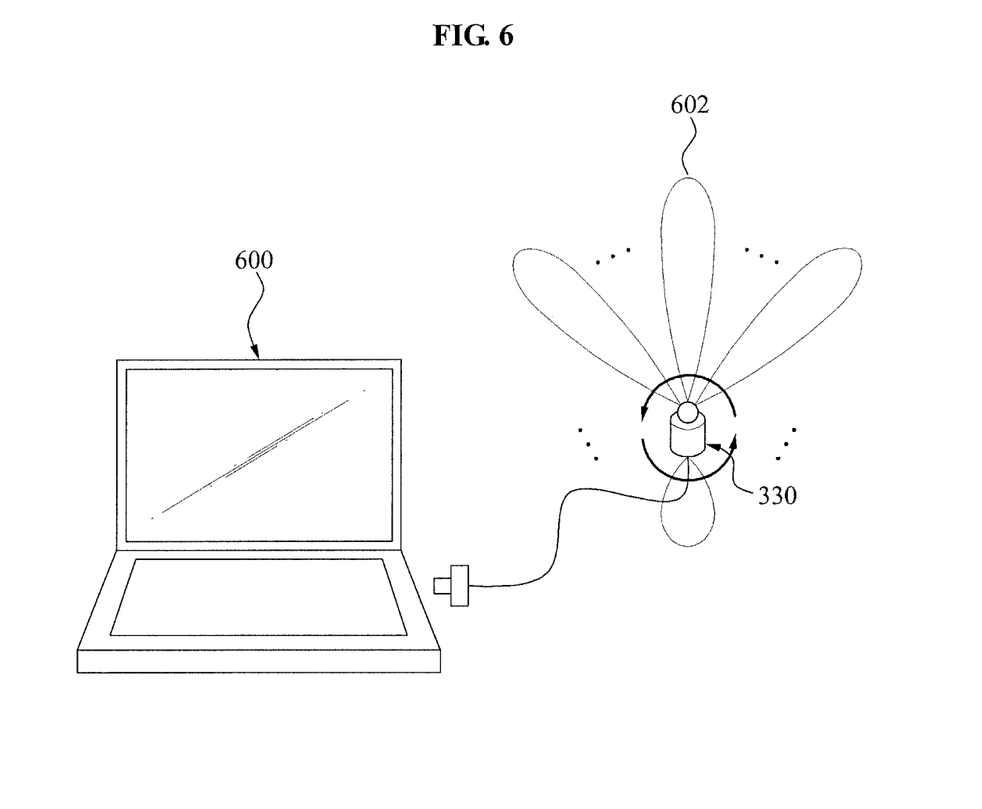
FIG. 6 is a diagram illustrating another example where a direction of a directional beam is varied in the HGWB communication modem of FIG. 3.

FIG. 6 is a diagram illustrating another example where the direction of the directional beam is varied in the HGWB communication modem 300 of FIG. 3.

Referring to FIG. 6, the HGWB communication modem 300 connected with a host device 600 generates a directional beam 602 from the extended body 330 to perform data communication. The user may control the ball-shape directional beam generator 370 at the extended body 330 of the HGWB communication modem 300, thereby fixing the direction of the directional beam 602 toward the target device to communicate with. Accordingly, communication with the target device is achieved.

Figure 4:
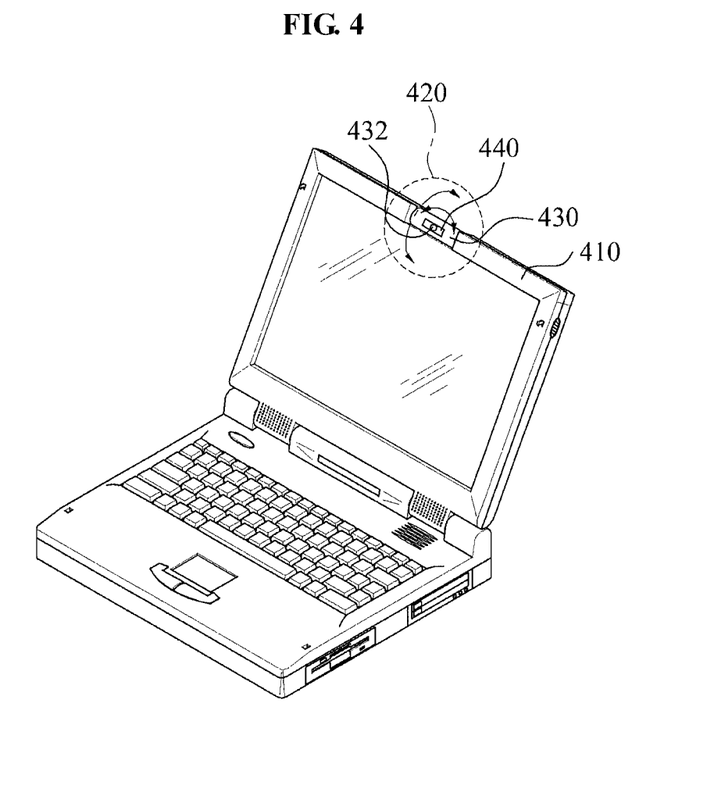
FIG. 4 is a diagram illustrating a configuration of a HGWB communication modem and a configuration enabling controlling of a direction of a beam, according to still another embodiment of the present invention.

FIG. 4 is a diagram illustrating a configuration of a HGWB communication modem 420 and a configuration enabling controlling of a direction of a beam, according to still another embodiment of the present invention.

Referring to FIG. 4, a HGWB communication modem 420 included in a host device 410 may include a main body 430 and a beam direction controller 440.

The main body 430 may rotate about the host device 410 by being connected to the host device 410 as shown in FIG. 4. The main body 430 may include a first communication system (not shown) that includes part of components for data communication.

The beam direction controller 440 may include a second communication system (not shown) that includes part of the components for data communication, and a directional beam generator 430 that outputs a directional beam.

The directional beam generator 432 may control the direction of the directional beam by two rotation shafts.

The first communication system may include at least one component among the baseband processor 120, the parallel/serial converter 130, and the RF processor 140. Here, the second communication system may include the remaining components that are absent from the first communication system.

An example where the HGWB communication modem 420 is applied will be described with reference to FIGS. 7A and 7B.

Figure 7A:
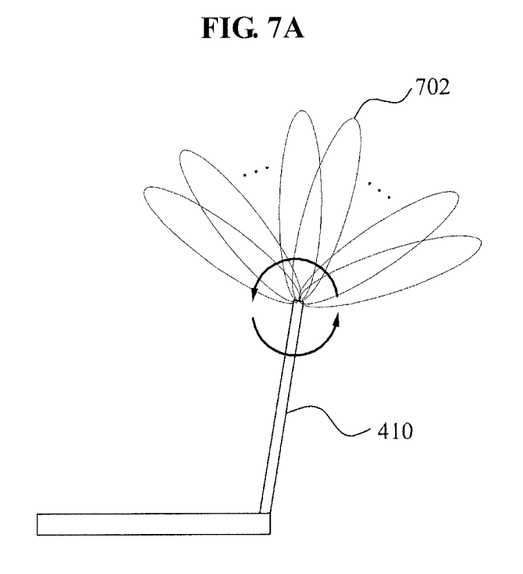
FIGS. 7A and 7B are diagrams illustrating still other examples where a direction of a directional beam is varied in a HGWB communication modem of FIG. 4.
Figure 7B:
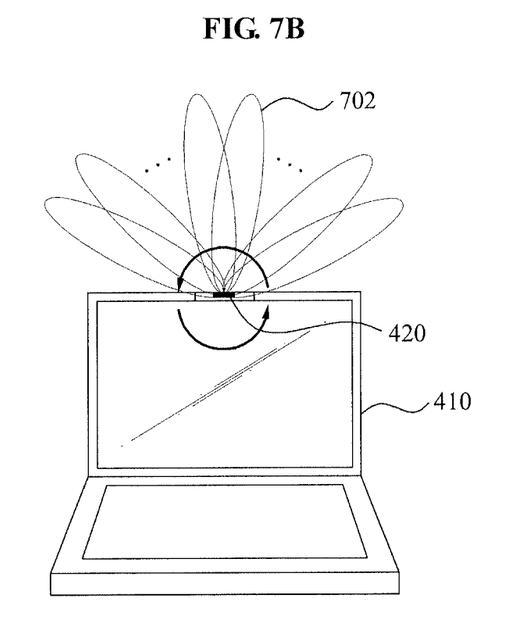

FIGS. 7A and 7B are diagrams illustrating still other examples where the direction of the directional beam is varied in the HGWB communication modem 420 of FIG. 4. FIG. 7A is a side view of the host device 410, showing that the direction of the directional beam is varied. FIG. 7B is a front view of the host device 410, showing that the direction of the directional beam is varied.

Referring to FIGS. 7A and 7B, the HGWB communication modem 420 in connection with the host device 410 generates the directional beam 702 for data communication. The user may fix the direction of the directional beam 702 toward the target device to communicate with, by controlling the two rotation shafts of the directional beam generator 432 of the HGWB communication modem 420. Accordingly, communication with the target device is achieved.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A wideband (WB) communication modem comprising:
   an interface configured to transceive data in connection with a host device;
   a baseband processor configured to process, in a parallel manner, a baseband signal being transceived between the interface and a converter;
   the converter configured to combine an input parallel signal into an output serial signal upon receiving the input parallel signal and output the output serial signal, and to separate an input serial signal into an output parallel signal upon receiving the input serial signal and output the output parallel signal;
   a radio frequency (RF) processor configured to reduce a frequency of a received WB signal and transmit the frequency-reduced signal to the converter, and increase a frequency of the output serial signal received from the converter and transmit the frequency-increased signal to a directional antenna; and
   the directional antenna configured to transceive a wireless signal by forming a fixed-type directional beam and control a direction of the fixed-type directional beam to communicate with a target device by fixing the direction of the fixed-type directional beam, wherein a directional beam generator sets a beam angle for transmission to be relatively smaller than a beam angle for reception,
   wherein the communication modem comprises a first communication system and a second communication system, and
   the first communication system comprises at least one component among the baseband processor, the converter, and the RF processor, and
   the second communication system comprises at least one component not present in the first communication system among the baseband processor, the converter, and the RF processor, and
   the first communication system and the second communication system are disposed to be in separate enclosures interconnected by a connection line,
   wherein the directional antenna comprises:
   an antenna pole configured to comprise with the phrase "the directional beam generator which is further configured to output the directional beam", the second communication system, and a rotation unit mounted with the directional beam generator, the rotation unit configured to be rotated by about 360 degrees; and
a joint configured to connect the antenna pole with the first communication system and perform 2-axis rotation about the first communication system.

2. The WB communication modem of claim 1, wherein the interface uses a high definition multimedia interface (HDMI) or a universal serial bus (USB) interface.

3. The WB communication modem of claim 1, wherein the directional beam generator is configured to wirelessly transmit, by generating the directional beam, the output serial signal which is frequency-increased by the RF processor, and transmit the wireless frequency signal received through the directional beam to the RF processor.

4. The WB communication modem of claim 1, wherein the directional beam has a beam of one of about 60, 45, 30, and 15 degrees at the time of transmission while having a beam of one of about 360, 180, 90, and 60 degrees at the time of reception.

5. A wideband (WB) communication modem comprising:
an interface configured to transceive data in connection with a host device;
a directional antenna configured to comprise a second communication system, transceive a wireless signal by generating a fixed-type directional beam, and control a direction of the fixed-type directional beam to communicate with a target device by fixing the direction of the fixed-type directional beam, wherein the directional beam has a beam angle for transmission relatively smaller than a beam angle for reception; and
a communication apparatus configured to comprise a first communication system, and comprise the interface and the directional antenna mounted on the communication apparatus,
wherein the first communication system comprises at least one component among a baseband processor, a converter, and an RF processor, and
the second communication system comprises at least one component not present in the first communication system among the baseband processor, the converter, and the RF processor, and
the first communication system and the second communication system are disposed to be in separate enclosures interconnected by a connection line,
wherein the directional antenna comprises:
an antenna pole configured to comprise a beam generator to output the directional beam, the second communication system, and a rotation unit mounted with the beam generator, the rotation unit configured to be rotated by about 360 degrees; and
a joint configured to connect the antenna pole with the first communication system and perform 2-axis rotation about the first communication system.

6. The WB communication modem of claim 5, wherein
the baseband processor processes a baseband signal transceived between the interface and the converter in a parallel manner,
the converter combines an input parallel signal into an output serial signal upon receiving the input parallel signal and outputs the output serial signal, and separates an input serial signal into an output parallel signal upon receiving the input serial signal and outputs the output parallel signal, and
the RF processor reduces a frequency of a received WB signal and transmits the frequency-reduced signal to the converter, and increases a frequency of the output serial signal received from the converter and transmits the frequency-increased signal to the directional antenna.

7. The WB communication modem of claim 5, wherein the directional beam has a beam of one of about 60, 45, 30, and 15 degrees at the time of transmission while having a beam of one of about 360, 180, 90, and 60 degrees at the time of reception.

8. A WB communication modem comprising:
an interface configured to transceive data in connection with a host device;
a first communication apparatus configured to comprise a first communication system, and the interface, the interface mounted on the first communication apparatus; and
a second communication apparatus connected with the first communication apparatus through a lead wire, configured to comprise a second communication system and a fixed-type directional beam generator, and configured to control a direction of a fixed-type directional beam output from the directional beam generator to communicate with a target device by fixing the direction of the fixed-type directional beam, wherein the directional beam has a beam angle for transmission relatively smaller than a beam angle for reception,
wherein the first communication apparatus comprises at least one component among a baseband processor, a converter, and an RF processor, and
the second communication apparatus comprises at least one component not present in the first communication apparatus among the baseband processor, the converter, and the RF processor, and
the first communication apparatus and the second communication apparatus are disposed to be in separate enclosures,
wherein the second communication apparatus comprises:
an antenna pole configured to comprise the directional beam generator, the second communication system, and a rotation unit mounted with the directional beam generator, the rotation unit configured to be rotated by about 360 degrees; and
a joint configured to connect the antenna pole with the first communication apparatus and perform 2-axis rotation about the first communication apparatus.

9. The WB communication modem of claim 8, wherein
the baseband processor processes a baseband signal transceived between the interface and the converter in a parallel manner,
the converter combines an input parallel signal into an output serial signal upon receiving the input parallel signal and outputs the output serial signal, and separates an input serial signal into an output parallel signal upon receiving the input serial signal and outputs the output parallel signal, and
the RF processor reduces a frequency of a received WB signal and transmits the frequency-reduced signal to the converter, and increases a frequency of the output serial signal received from the converter and transmits the frequency-increased signal to the directional antenna.

10. The WB communication modem of claim 8, wherein the directional beam has a beam of one of about 60, 45, 30, and 15 degrees at the time of transmission while having a beam of one of about 360, 180, 90, and 60 degrees at the time of reception.

* * * * *